United States Patent [19]
Fawer

[11] Patent Number: 5,609,783
[45] Date of Patent: Mar. 11, 1997

[54] INERT GAS FOR THE ARC WELDING OF ALUMINUM

[75] Inventor: Alfward Fawer, Meerbuch, Germany

[73] Assignee: Messer Griesheim GmbH, Germany

[21] Appl. No.: 665,587

[22] Filed: Jun. 18, 1996

Related U.S. Application Data

[63] Continuation of Ser. No. 488,484, Jun. 8, 1995, abandoned.

[30] Foreign Application Priority Data

Dec. 12, 1992 [DE] Germany .............. 42 41 982.4
Dec. 2, 1993 [WO] WIPO ............ PCT/EP93/03388

[51] Int. Cl.$^6$ ................................................ B23K 9/167
[52] U.S. Cl. ........................ 219/137 WM; 219/75
[58] Field of Search ................ 219/137 WM, 219/137 R, 74, 75

[56] References Cited

U.S. PATENT DOCUMENTS 4,292,493  9/1981  Selander et al. .

FOREIGN PATENT DOCUMENTS 2369900   6/1978   France .
4241982   11/1993  Germany .
2235576   12/1990  Japan .
1045620   10/1966  United Kingdom .
91/13720  9/1991   WIPO .

OTHER PUBLICATIONS

"Shielding gas lowers pollutant emissions", Erik Smars, Welding and Metal Fabrication, vol. 49 (1981), pp. 399–401.

Primary Examiner—Clifford C. Shaw
Attorney, Agent, or Firm—Connolly & Hutz

[57] ABSTRACT

In arc welding of aluminum using an inert gas, 80 to 250 ppm of $N_2O$ is added to the inert gas to improve the welding process and the welding result.

8 Claims, 1 Drawing Sheet

INERT GAS FOR THE ARC WELDING OF ALUMINUM

This application is a continuation of application Ser. No. 08/488,484 filed on Jun. 8, 1995 now abandoned.

The invention relates to an inert gas for the arc welding of aluminum and consisting of argon or mixtures of argon and helium.

For several reasons, tungsten inert-gas (TIG) welding and metal inert-gas (MIG) welding are both much more restricted than, for example, metal active-gas (MAG) welding, when it comes to the selection of the inert gas. For instance, MAG welding frequently involves adding active components such as oxygen and carbon dioxide to argon, which is a widely used basic gas. In contrast to welding with pure inert gas, that is to say, with argon or argon-helium mixtures, this translates into marked improvements in terms of the welding procedure and of the welding results.

The limitations are particularly vexing when it comes to adding of other components to the inert gas for aluminum welding. In this case, due to the high reactivity of the aluminum, detrimental effects occur immediately. Thus, for instance, hydrogen gives rise to pores, while oxygen and nitrogen form oxides or nitrides, respectively. This is not acceptable, already from the viewpoint of the appearance of the seam. Therefore, when aluminum is being welded, technically pure inert gases are used, in other words, argon or argonhelium mixtures having a degree of purity of at least 99.996%. Therefore, the sum of all impurities amounts to 40 ppm at the maximum.

German Patent No. 40 28 074 discloses the addition of 80 to 250 ppm of nitrogen to the inert gas for purposes of improving the welding procedure and the welding result.

The invention has the objective of finding an alternative to the inert gas known from German Patent No. 40 28 074.

On the basis of the state of the art in arc welding using argon or mixtures of argon and helium, this objective is achieved by means of an additive of 80 to 250 ppm of nitrous oxide.

The subclaims contains advantageous embodiments of the invention.

Surprisingly, it has turned out that the addition according to the invention of small amounts of nitrous oxide $N_2O$ (laughing gas) which, on the one hand, are markedly above the maximum permissible impurities in the inert gas but which, on the other hand, lie well below the commonly added amounts of gas mixtures, brings about advantageous effects. As a consequence, the leeway for the addition of $N_2O$ is very narrow and lies between 80 ppm at the minimum and 250 ppm at the maximum.

In the case of alternating-current WIG welding, the advantages have to do primarily with a calmer arc which burns in a more stable manner. In comparison to the welding method according to the state of the art, the arc is more concentrated and allows a higher application of energy.

There are also major advantages found with the MIG-welding of aluminum. Here, too, the material transition is very calm, with the result that the seams remain extremely shiny. An additional factor is an improved, very smooth flow on the seam flank while welding penetration is also intensified.

The preferred range for the $N_2O$ admixture according to the invention extends from 120 to 180 ppm, with an optimum at 150 ppm.

The above-mentioned advantageous effects disappear with $N_2O$ contents below 80 ppm while, in contrast, detrimental side effects occur with $N_2O$ contents above 250 ppm. For instance, detrimental discoloration of the seam occurs in TIG welding, while the fillet welds sag considerably in MIG welding.

The inert gas with the $N_2O$ admixture according to the invention can be produced by various methods. The mixture can be either directly created on the basis of the initial components, or else a parent mixture having a higher concentration is made first, which is then added in the form of gas. Mixing in the liquid phase is also possible.

In special cases, it is also possible to add some oxygen in addition to the $N_2O$; this is likewise done in amounts which are only slightly above the level of the impurities in the inert gas of technical quality.

Comparative experiments on the penetration of the weld were carried out with pure argon and argon with an addition of 150 ppm of $N_2O$.

The penetration behavior can be demonstrated very clearly in a comparison to so-called build-up welding, whereby the welding is executed in such a manner that there is no complete root penetration.

DESCRIPTION OF THE DRAWINGS

FIG. 1 shows the result of an MIG build-up weld at 100 A onto a 5 mm-thick aluminum plate. A wire electrode with a thickness of 1.2 mm made of an AL-Si alloy ($AlSi_5$) was employed. The welding speed was 0.3 m/min. The use of pure argon translates into a very unstable weld and application of the metal without a good connection to the plate, with a marked bulge of the additional material. In contrast, the low $N_2O$ addition intensifies penetration to such an extent that the result is a smooth, flawless welding bead top surface with a normal penetration profile and secure flank formation.

FIG. 2 shows a joint weld on a 5 mm-thick plate with a wire electrode made of an Al-Mg-Mu alloy ($AlMg_4$, 5 Mn). Here, pure argon at a current of 130 A results in unsatisfactory penetration; with an $N_2O$ addition of 150 ppm, a reliable root welding is achieved. (Welding speed of 0.35 m/min). Moreover, the weld top surface has finer scales and there is less weld bulging.

For comparison purposes, FIG. 3 shows the penetration levels of a TIG weld on onto an 8 mm-thick plate at a current of 250 A. If root penetration is to be achieved with argon, it is necessary to reduce the welding speed by approximately 20%.

Figure 1:
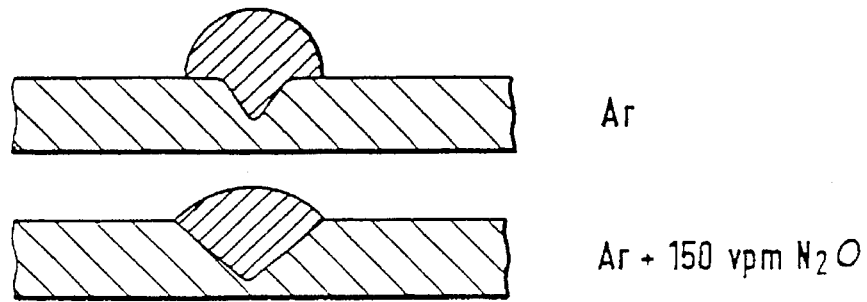
FIG. 1 shows side-sectional views of MIG build-up welds.
Figure 2:
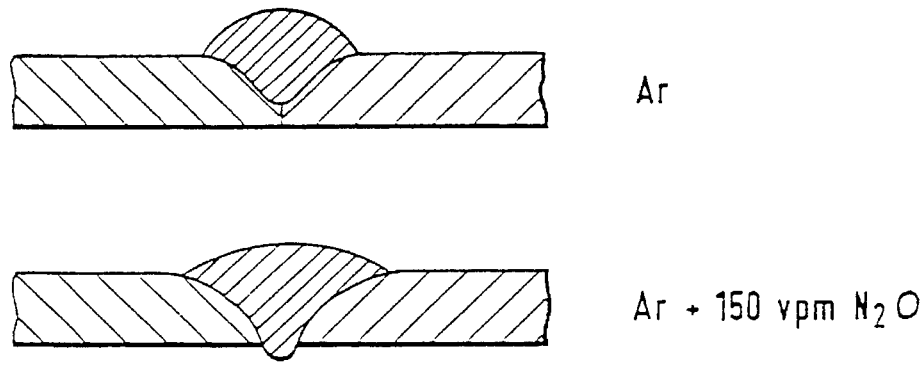
FIG. 2 shows side-sectional views of joint welds with wire electrodes.
Figure 3:
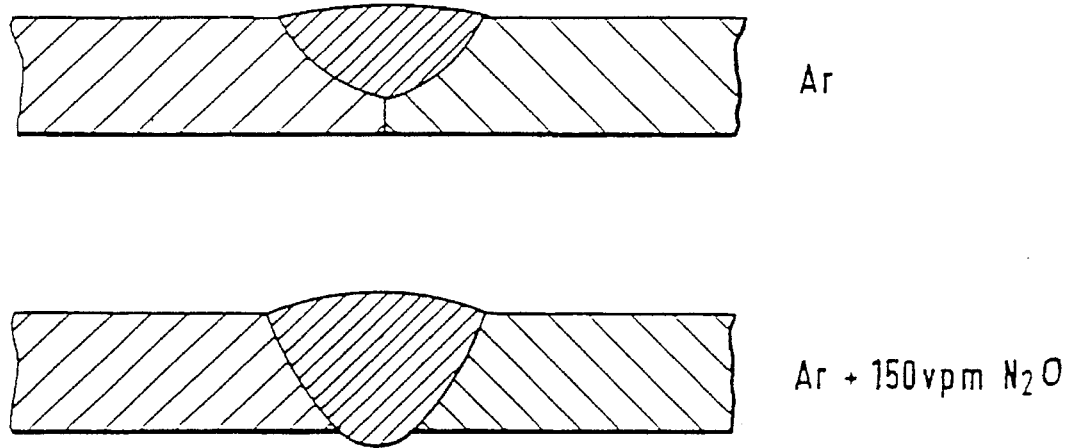
FIG. 3 shows side-sectional views of TIG welds.

Another fundamental advantage of the $N_2O$ admixture is that both the ignition behavior and the arc stability have always been more favorable.

I claim:

1. An inert gas used in arc welding, which comprises a) argon or b) a mixture of argon and helium, wherein the gas contains 80 to 250 ppm of nitrous oxide.

2. The inert gas of claim 1, wherein the gas contains 120 to 180 ppm of nitrous oxide.

3. A process for arc welding of aluminum, which comprises adding 80 to 250 ppm of nitrous oxide to an inert gas, wherein the inert gas is a) argon or b) a mixture of argon and helium.

4. The process of claim 3, wherein the arc welding is tungsten inert-gas welding.

5. The process of claim 3, wherein the arc welding is metal inert-gas welding.

6. The process of claim 3, wherein 120 to 180 ppm of nitrous oxide is added.

7. In a process for arc welding of aluminum using an inert gas, and the inert gas is a) argon or b) a mixture of argon and helium, wherein the improvement comprises adding 80 to 250 ppm of nitrous oxide to the inert gas.

8. The process of claim 7, wherein 120 to 180 ppm of nitrous oxide is added.

* * * * *